US012581417B2

(12) United States Patent
Banerjea

(10) Patent No.: US 12,581,417 B2
(45) Date of Patent: Mar. 17, 2026

(54) MULTI-RECEIVE MODE MILLIMETER WAVE (mmWave) OPERATION

(71) Applicant: QUALCOMM Incorporated, San Diego, CA (US)

(72) Inventor: Raja Banerjea, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 18/313,208

(22) Filed: May 5, 2023

(65) Prior Publication Data

US 2024/0373362 A1 Nov. 7, 2024

(51) Int. Cl.
*H04W 52/02* (2009.01)
*H04W 74/0816* (2024.01)

(52) U.S. Cl.
CPC ... *H04W 52/0248* (2013.01); *H04W 74/0816* (2013.01)

(58) Field of Classification Search
CPC ......... H04W 52/0248; H04W 74/0816; H04W 84/12; H04W 88/06; H04W 88/10; H04W 56/0045; H04W 56/0005; H04W 76/15; H04B 7/024; H04B 7/06952; G06F 1/3209; G06F 1/3278
See application file for complete search history.

(56) References Cited

U.S. PATENT DOCUMENTS

| | | | |
|---|---|---|---|
| 2016/0044711 A1* | 2/2016 | Lou | H04B 7/0617 370/338 |
| 2020/0288439 A1 | 9/2020 | Seok et al. | |
| 2022/0104261 A1* | 3/2022 | Kwon | H04W 48/16 |

OTHER PUBLICATIONS

International Search Report and Written Opinion—PCT/US2024/026109—ISA/EPO—Aug. 21, 2024.
Lan X., et al., "Enhanced Multilink Single-Radio Operation for the Next-Generation IEEE 802.11 BE Wi-Fi Systems", Security and Communication Networks, vol. 2022, Oct. 6, 2022, pp. 1-11, XP093136078, pp. 1-10.

* cited by examiner

*Primary Examiner* — Jianye Wu
(74) *Attorney, Agent, or Firm* — ArentFox Schiff LLP

(57) ABSTRACT
This disclosure provides methods, components, devices and systems for multi-receive mode millimeter wave (mmWave) operation. In some examples, a method may include receiving, by the wireless communication device in a first receive mode, a multi-user request to send (MU-RTS) in a first frequency spectrum. The method may further include identifying, by the wireless communication device and based on the MU-RTS, a receiver radio frequency (RF) chain associated with data reception in a second frequency spectrum. Further, the method may include switching, by the wireless communication device and based on the identifying, from the first receive mode to a second receive mode that uses the receiver RF chain; and receiving, by the wireless communication device, data via the receiver RF chain.

18 Claims, 13 Drawing Sheets

900

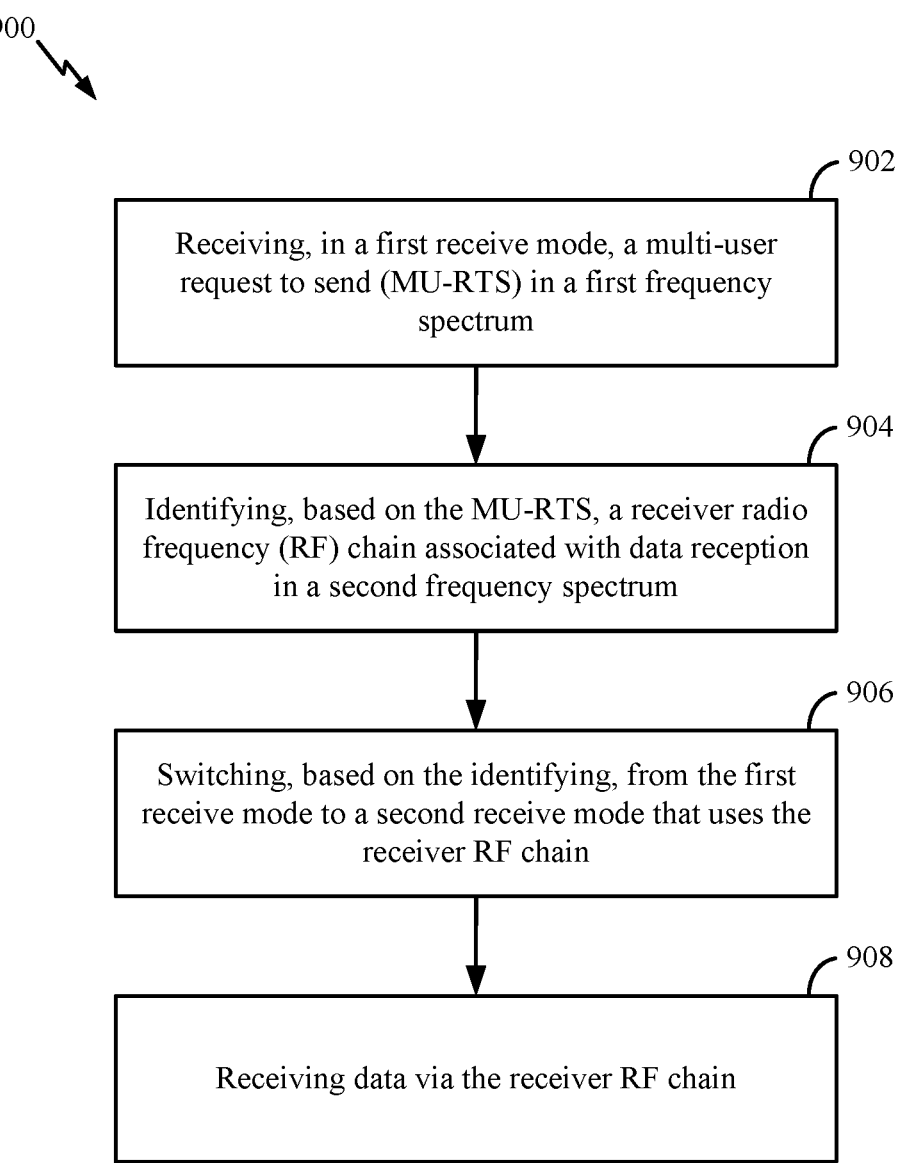

902

Receiving, in a first receive mode, a multi-user request to send (MU-RTS) in a first frequency spectrum

904

Identifying, based on the MU-RTS, a receiver radio frequency (RF) chain associated with data reception in a second frequency spectrum

906

Switching, based on the identifying, from the first receive mode to a second receive mode that uses the receiver RF chain

908

Receiving data via the receiver RF chain

Transmitting, to a wireless device in a first transmit mode corresponding to a first frequency spectrum, a multi-user request to send (MU-RTS) including an identifier of a receiver radio frequency (RF) chain associated with data reception in a second frequency spectrum

1004

Transmitting data via the receiver RF chain

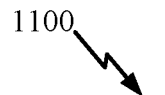
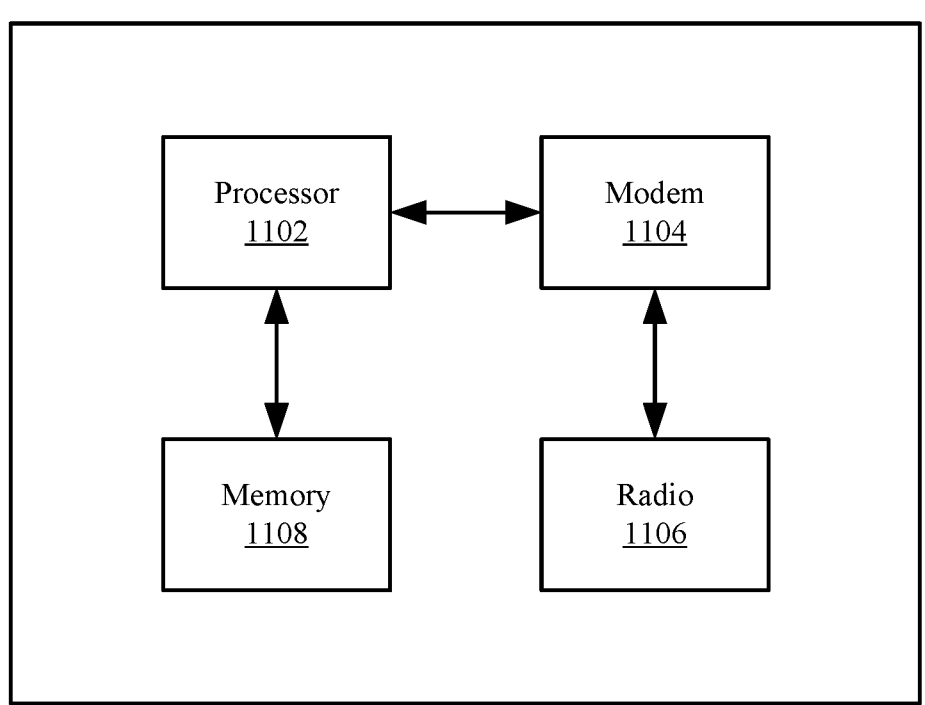
*Figure 11*

1200
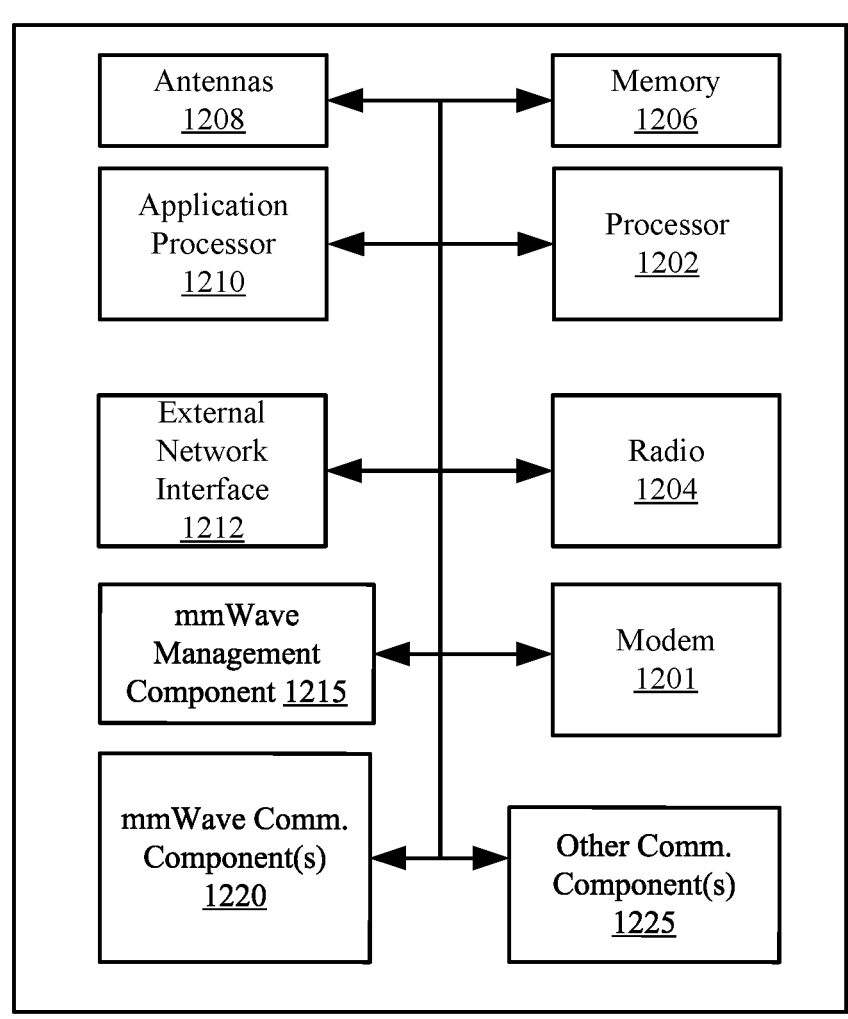
| Antennas 1208 | Memory 1206 |
| Application Processor 1210 | Processor 1202 |
| External Network Interface 1212 | Radio 1204 |
| mmWave Management Component 1215 | Modem 1201 |
| mmWave Comm. Component(s) 1220 | Other Comm. Component(s) 1225 |
*Figure 12*

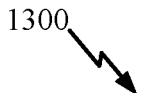
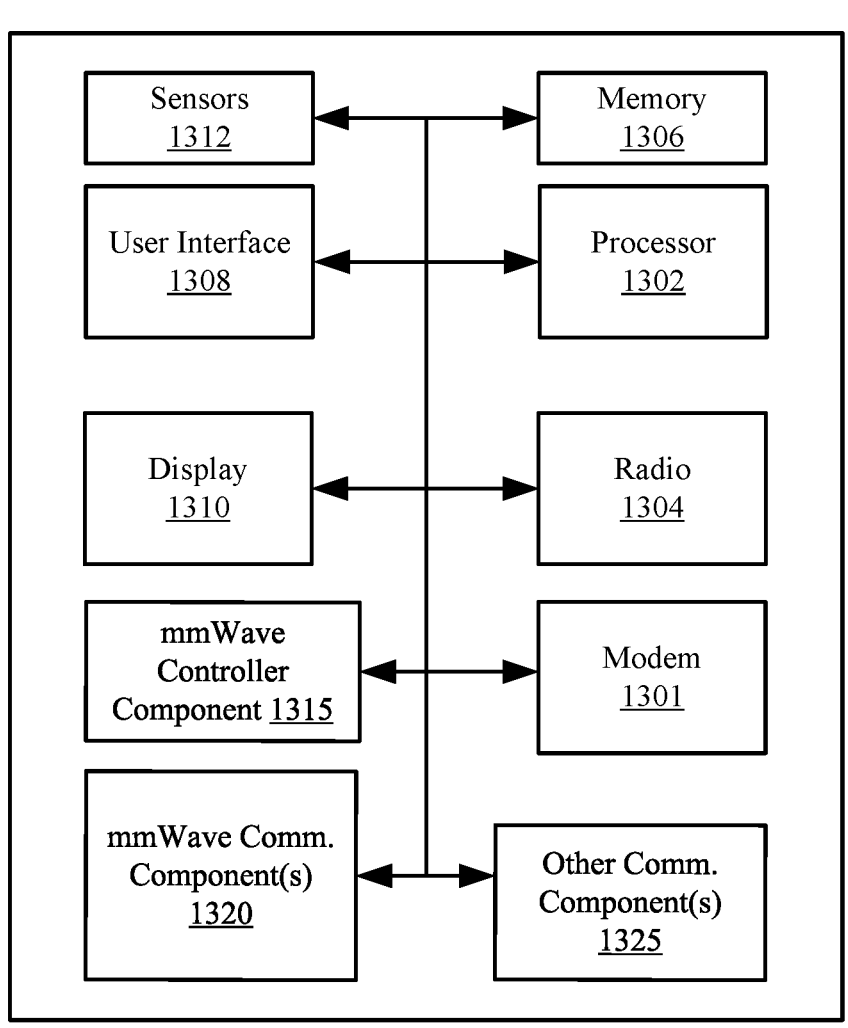
*Figure 13*

MULTI-RECEIVE MODE MILLIMETER WAVE (mmWave) OPERATION

TECHNICAL FIELD

This disclosure relates generally to wireless communication, and more specifically, to enabling efficient millimeter wave (mmWave) operation, such as in the Institute of Electrical and Electronics Engineers (IEEE) 802.11 family of standards.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes receiving, by the wireless communication device in a first receive mode, a multi-user request to send (MU-RTS) in a first frequency spectrum; identifying, by the wireless communication device and based on the MU-RTS, a receiver radio frequency (RF) chain associated with data reception in a second frequency spectrum; switching, by the wireless communication device and based on the identifying, from the first receive mode to a second receive mode that uses the receiver RF chain; and receiving, by the wireless communication device, data via the receiver RF chain.

Another innovative aspect of the subject matter described in this disclosure can be implemented in a wireless communication device. The wireless communication device includes at least one memory, and at least one processor communicatively coupled with the at least one memory. Further, the at least one processor is operable to cause the wireless communication device to: receive, by the wireless device in a first spectrum, a multi-user request to send (MU-RTS) from an access point (AP); identify, by the wireless device, based on the MU-RTS, a receiver radio frequency (RF) chain for data reception in a second spectrum; switch, by the wireless device, to a receive mode that employs the receive RF chain in response to the identifying; and receive, by the wireless device data from the access point via the receive RF chain.

Another innovative aspect of the subject matter described in this disclosure can be implemented in a computer-readable medium including stored instructions for wireless communication by a wireless communication device, executable by a processor to receive, by the wireless device in a first spectrum, a multi-user request to send (MU-RTS) from an access point (AP). The instructions are further executable to identify, by the wireless device, based on the MU-RTS, a receiver radio frequency (RF) chain for data reception in a second spectrum. The instructions are further executable to switch, by the wireless device, to a receive mode that employs the receive RF chain in response to the identifying and receive, by the wireless device data from the access point via the receive RF chain Another innovative aspect of the subject matter described in this disclosure can be implemented in a wireless communication device. The wireless communication device includes means for receiving, by the wireless device in a first spectrum, a multi-user request to send (MU-RTS) from an access point (AP). The apparatus further includes means for identifying, by the wireless device, based on the MU-RTS, a receiver radio frequency (RF) chain for data reception in a second spectrum. The apparatus further includes means for switching, by the wireless device, to a receive mode that employs the receive RF chain in response to the identifying and means for receiving, by the wireless device data from the access point via the receive RF chain.

In some examples of the methods and wireless communication devices, receiving the MU-RTS further comprises receiving the MU-RTS in a reduced power mode.

In some examples of the methods and wireless communication devices, receiving the MU-RTS includes receiving the MU-RTS while one or more components associated with a medium access control (MAC) layer and a physical (PHY) layer are powered down, and wherein the one or more components are coupled with the receiver RF chain.

In some examples of the methods and wireless communication devices, switching to the second receive mode using the RF chain includes activating one or more components associated with a medium access control (MAC) layer and a physical (PHY) layer coupled with the receiver RF chain.

In some examples of the methods and wireless communication devices, wherein the first frequency spectrum is a sub-7 gigahertz (GHz) band and the second frequency spectrum is a millimeter wave (mmWave) band.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 9 shows a flowchart illustrating an example process performable by a wireless STA that supports multi-receive mode mmWave operation.

FIG. 11 shows a block diagram of an example wireless communication device.

FIG. 12 shows a block diagram of an example wireless communication device that supports multi-receive mode mmWave operation.

FIG. 13 shows a block diagram of an example wireless communication device that supports multi-receive mode mmWave operation.

Like reference numbers and designations in the various drawings indicate like elements.

DETAILED DESCRIPTION

Figure 1:
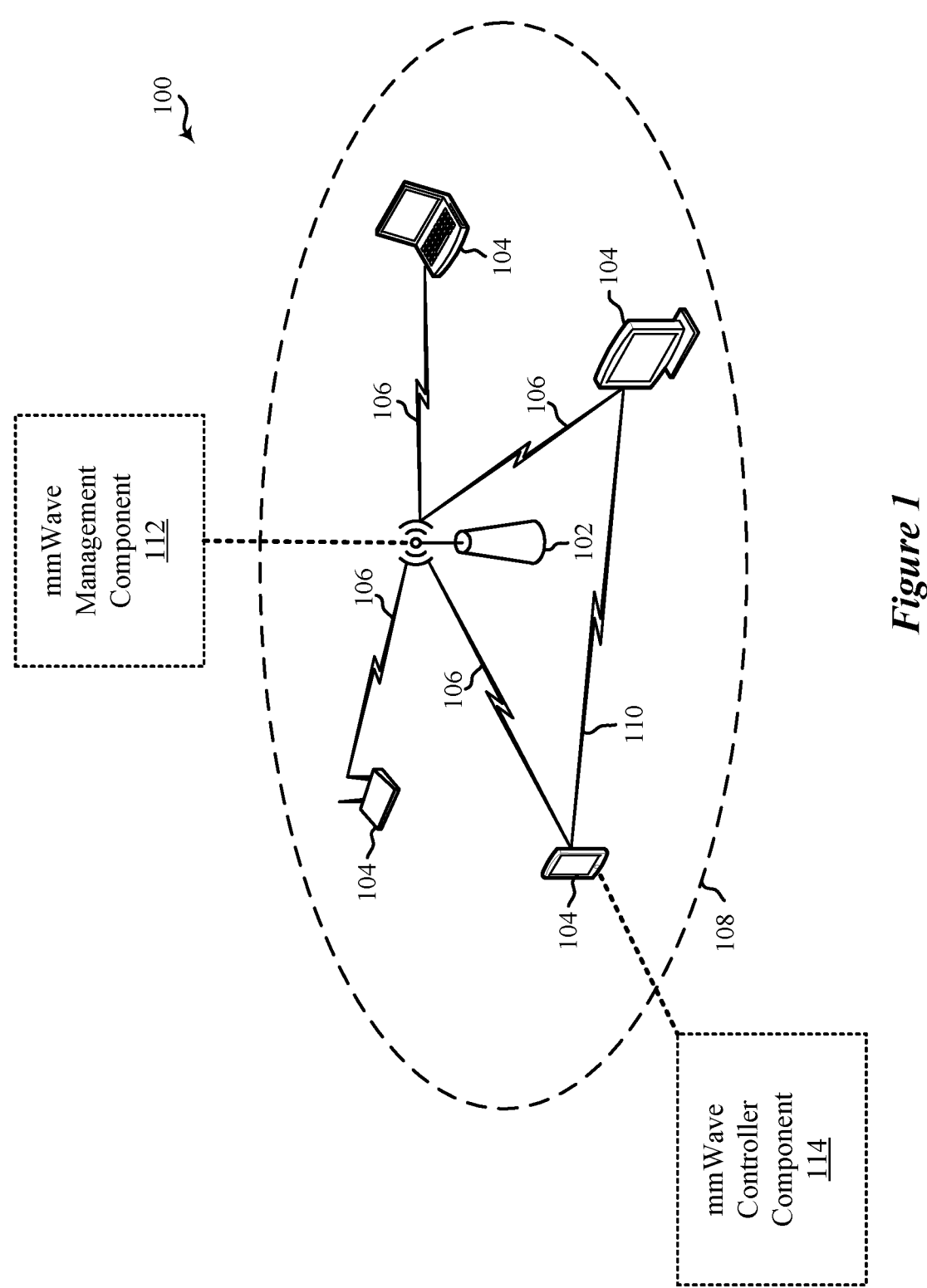
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Evolving wireless communication systems may communicate using one or more of several mmWave frequency ranges as mmWave techniques provide one of the most important approaches for the next generation of wireless communication systems. Modern applications often include multimedia services, high-quality audio and/or video, and real-time services that rely on high throughput and low latency. In order to meet the needs of modern applications, large bands of spectrum may be needed. Due to spectrum scarcity, wireless bands having a sufficient bandwidth may be unavailable with RF wireless technologies at lower frequencies. For example, peak throughput increase in sub-7 GHz post Wi-Fi 7 may be limited due to lack of spectrum in sub-7 GHz and signal processing being close to the Shannon limit. By contrast, the mmWave frequency bands may be less crowded than the low-gigahertz radio communication bands and, more attractively, may have wider license-free RF bandwidth available. Some regulatory bodies have recently decided to permit unlicensed operation on some mm Wave frequency ranges (e.g., 48 GHZ, 60 GHZ) having more than 1 GHz of spectrum available in their related jurisdictions. Communications using such mmWave frequencies, however, may introduce design difficulties from an operational perspective. For example, power consumption is one challenge in mmWave implementations, due to the need to support high dimensional antenna arrays at wide bandwidths. Moreover, efficient power consumption is yet another focus of certain applications Various aspects relate generally to enabling mmWave operation, such as in IEEE 802.11. Some aspects more specifically relate to implementing receiver mode management techniques that may provide power savings in devices utilizing mmWave frequencies. In some examples, an AP may transmit a control message (e.g., a multi-user request to send (MU-RTS)) to a STA. The MU-RTS may be a trigger frame and may be configured to trigger a particular receive mode at the STA. In some aspects, the MU-RTS may include a link identifier identifying a physical link, a receiver radio frequency (RF) chain, and/or spectrum frequency associated with the particular receive mode at the STA. Upon receipt of the control message, the STA may activate the receive mode identified within the control message. For example, in some aspects, the STA may be in a first receive mode that employs a first RF chain. Further, in response to receipt of a control message identifying the second receive mode, the STA may switch to the second receive mode. In some instances, the first receive mode may correspond to a low or reduced power mode of the STA where one or more mmWave communication components may be powered down. Additionally, switching to the second receive mode may include powering up the one or more mmWave communication components, and receiving data from the AP via the one or more mmWave communication components.

Particular aspects of the subject matter described in this disclosure can be implemented to realize one or more of the following potential advantages. In some examples, by activating and deactivating mmWave operation, the described techniques can be used to reduce power consumption while gaining the benefits of license-free RF bandwidth available. More specifically, powering down one or more mmWave communication components when they are not in use may reduce power consumption for a STA. Further, powering on the one or more mmWave communication components in response to a communication from an AP that the AP intends to transmit data via the mmWave frequency spectrum may permit the STA to provide throughput and latency requirements of modern applications.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az. 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells. In some aspects, an AP 102 may include a mm Wave management component 112 configured to enable mm Wave operation at the STAs 104, as described in more detail herein. Further, in some aspects, a STA 104 may include a mmWave controller component 114 configured to enable mmWave operation at the STA 104, as described in more detail herein. As described herein, in some aspects, the mmWave controller component 114 enables mmWave operation based at least in part on communications received from the mmWave management component 112 of an AP 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IOT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds ($\mu$s)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHZ bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHZ, 5 GHZ or 6 GHz bands, each of which is divided into multiple 20 MHz channels. As such, these PPDUs are transmitted over a physical channel having a minimum bandwidth of 20 MHZ, but larger channels can be formed through channel bonding. For example, PPDUs may be transmitted over physical channels having bandwidths of 40 MHZ, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
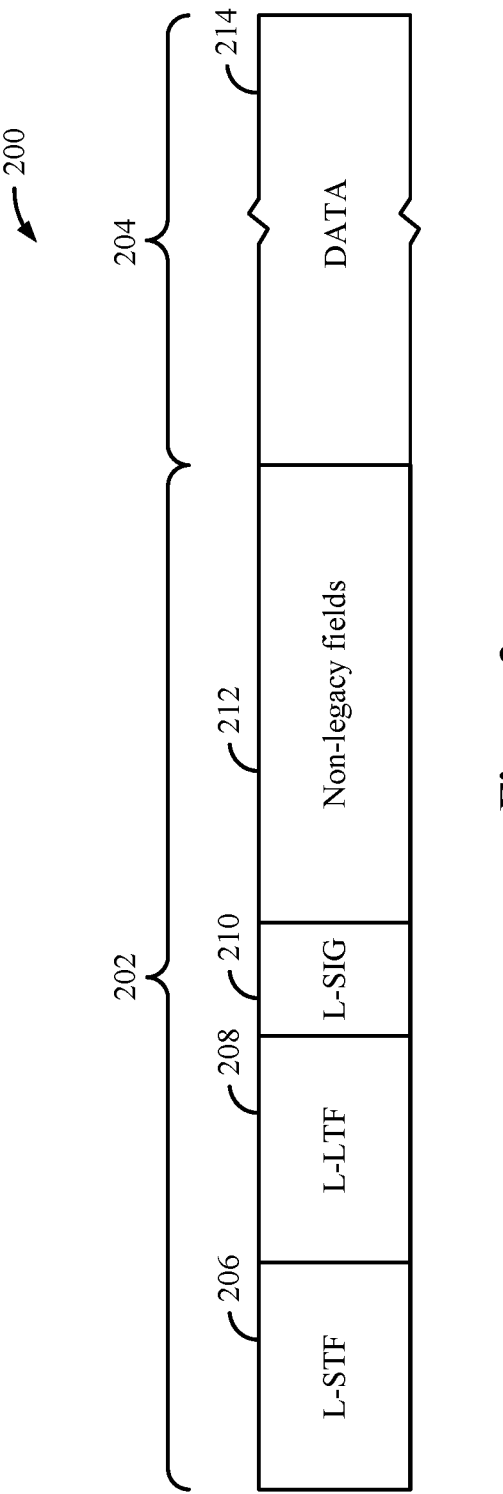
FIG. 2 shows an example protocol data unit (PDU) usable for communications between a wireless access point and one or more wireless stations.

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
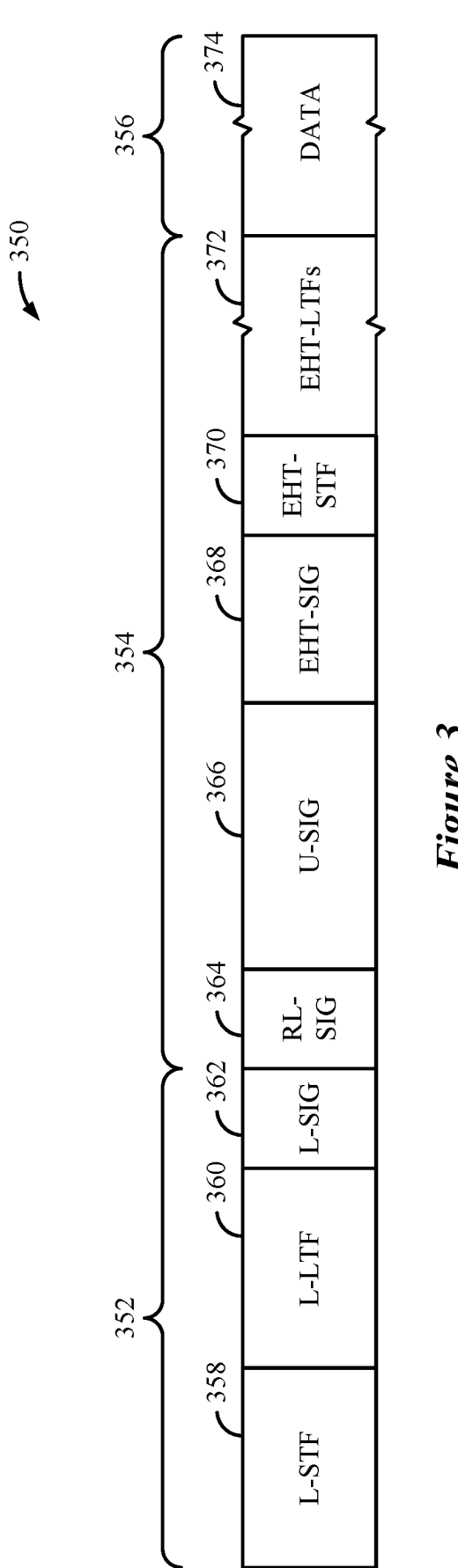
FIG. 3 shows an example physical layer (PHY) protocol data unit (PPDU) usable for communications between a wireless access point (AP) and one or more wireless stations (STAs).

FIG. 3 shows another example PPDU 350 usable for wireless communication between a wireless AP and one or more wireless STAs. The PPDU 350 may be used for SU, OFDMA or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP to identify and inform one or multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

In some wireless communications environments, Extremely High Throughput (EHT) systems or other systems compliant with future generations of the IEEE 802.11 family of wireless communication protocol standards may provide additional capabilities over other previous systems (for example, High Efficiency (HE) systems or other legacy systems). EHT and newer wireless communication protocols may support flexible operating bandwidth enhancements at APs and STAs, such as broadened operating bandwidths relative to legacy operating bandwidths or more granular operation relative to legacy operation. For example, an EHT system may allow communications spanning operating bandwidths of 20 MHZ, 40 MHZ, 80 MHZ, 160 MHZ, 240 MHZ and 320 MHZ. EHT systems may support multiple bandwidth modes such as a contiguous 240 MHZ bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device operates in a contiguous 320 MHz bandwidth mode or a 160+160 MHz bandwidth mode. Signals for transmission may be generated by two different transmit chains of the device each having a bandwidth of 160 MHZ (and each coupled to a different power amplifier). In some other examples, signals for transmission may be generated by four or more different transmit chains of the device, each having a bandwidth of 80 MHZ.

In some other examples, the wireless communication device may operate in a contiguous 240 MHz bandwidth mode, or a noncontiguous 160+80 MHz bandwidth mode. In some examples, the signals for transmission may be generated by three different transmit chains of the device, each having a bandwidth of 80 MHZ. In some other examples, the 240 MHz/160+80 MHZ bandwidth modes may also be formed by puncturing 320/160+160 MHz bandwidth modes with one or more 80 MHz subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some examples, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Transmitting and receiving devices may support the use of various modulation and coding schemes (MCSs) to transmit and receive data so as to optimally take advantage of wireless channel conditions, for example, to increase throughput, reduce latency, or enforce various quality of service (QOS) parameters. For example, existing technology supports the use of up to 1024-QAM, where a modulated symbol carries 10 bits. To further improve peak data rate, 4096-QAM (also referred to as "4 k QAM"), which enables a modulated symbol to carry 12 bits, also may be implemented. 4096-QAM may enable a 20% increase in data rate compared to 1024-QAM given the same coding rate, thereby allowing users to obtain higher transmission efficiency.

Figure 4:
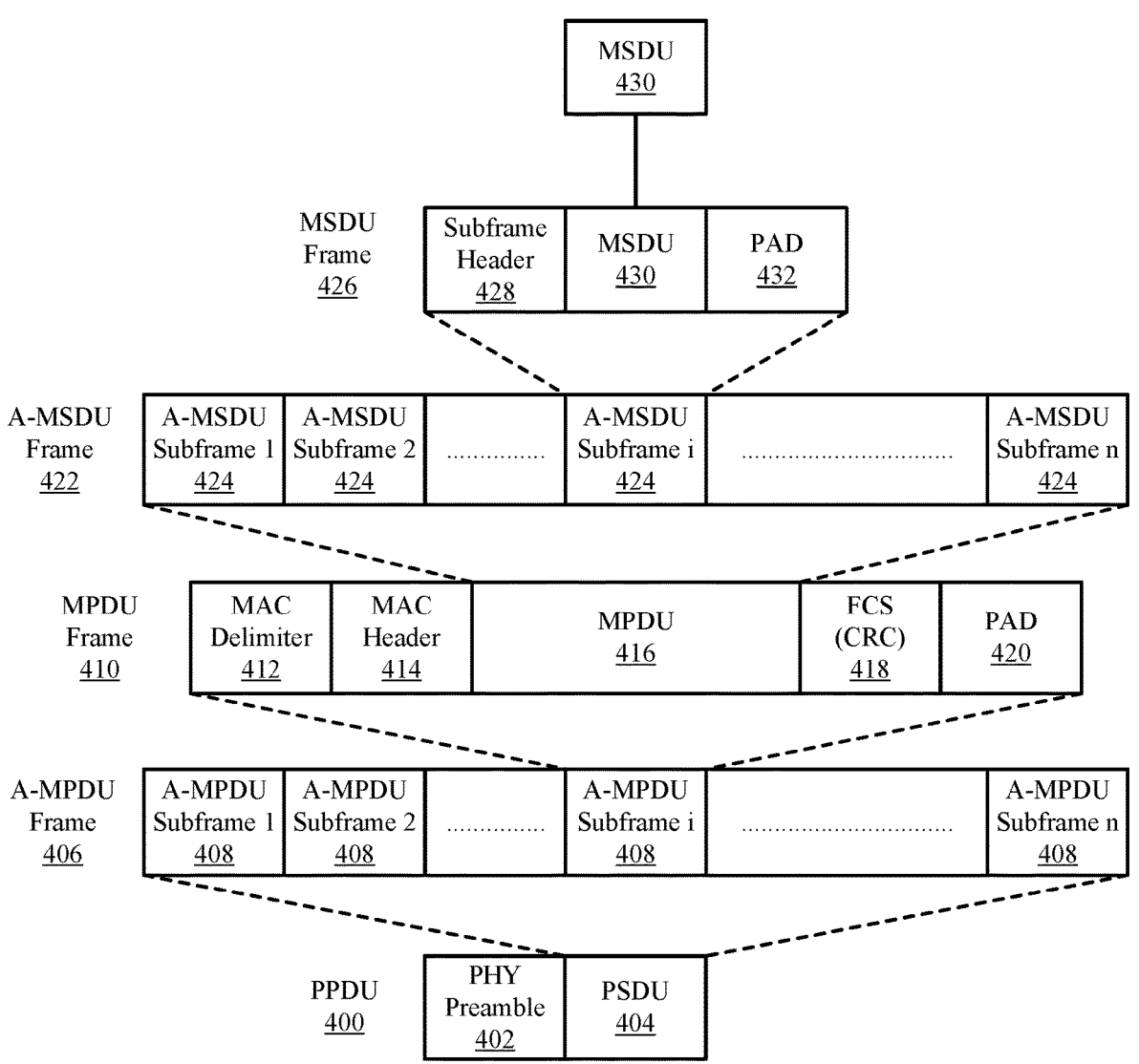
FIG. 4 shows a hierarchical format of an example PPDU usable for communications between a wireless AP and one or more wireless STAs.

FIG. 4 shows a hierarchical format of an example PPDU usable for communications between a wireless AP 102 and one or more wireless STAs 104. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas.

APs and STAs that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams. The $N_{SS}$ spatial streams may be mapped to a number $N_{STS}$ of space-time streams, which are then mapped to $N_{Tx}$ transmit chains.

APs and STAs that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. APs and STAs that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). In the MU-MIMO context, beamforming may additionally or alternatively involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. An NDP is a PPDU without any data field. The beamformee may then perform measurements for each of the $N_{Tx} \times N_{Rx}$ sub-channels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may then generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (for example, identify, detect, ascertain, calculate, or compute) how to transmit a signal on each of its antennas to perform beamforming. For example, the steering matrix may be indicative of a phase shift, power level, etc. to use to transmit a respective signal on each of the beamformer's antennas.

A transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions or nulls by increasing the number of transmit antennas. This is especially advantageous in MU transmission contexts in which it is particularly important to reduce inter-user interference.

To increase an AP's spatial multiplexing capability, an AP may need to support an increased number of spatial streams (such as up to 16 spatial streams). However, supporting additional spatial streams may result in increased CSI feedback overhead. Implicit CSI acquisition techniques may avoid CSI feedback overhead by taking advantage of the assumption that the UL and DL channels have reciprocal impulse responses (that is, that there is channel reciprocity). For examples, the CSI feedback overhead may be reduced using an implicit channel sounding procedure such as an implicit beamforming report (BFR) technique (such as where STAs transmit NDP sounding packets in the UL while the AP measures the channel) because no BFRs are sent. Once the AP receives the NDPs, it may implicitly assess the channels for each of the STAs and use the channel assessments to configure steering matrices. In order to mitigate hardware mismatches that could break the channel reciprocity on the UL and DL (such as the baseband-to-RF and RF-to-baseband chains not being reciprocal), the AP may implement a calibration method to compensate for the mismatch between the UL and the DL channels. For example, the AP may select a reference antenna, transmit a pilot signal from each of its antennas, and estimate baseband-to-RF gain for each of the non-reference antennas relative to the reference antenna.

In some examples, multiple APs may transmit to one or more STAs at a time utilizing a distributed MU-MIMO scheme. Examples of such distributed MU-MIMO transmissions include coordinated beamforming (CBF) and joint transmission (JT). With CBF, signals (such as data streams) for a given STA may be transmitted by only a single AP. However, the coverage areas of neighboring APs may overlap, and signals transmitted by a given AP may reach the STAs in OBSSs associated with neighboring APs as OBSS signals. CBF allows multiple neighboring APs to transmit simultaneously while minimizing or avoiding interference, which may result in more opportunities for spatial reuse. More specifically, using CBF techniques, an AP may beamform signals to in-BSS STAs while forming nulls in the directions of STAs in OBSSs such that any signals received at an OBSS STA are of sufficiently low power to limit the interference at the STA. To accomplish this, an inter-BSS coordination set may be defined between the neighboring APs, which contains identifiers of all APs and STAs participating in CBF transmissions.

With JT, signals for a given STA may be transmitted by multiple coordinated APs. For the multiple APs to concurrently transmit data to a STA, the multiple APs may all need a copy of the data to be transmitted to the STA. Accordingly, the APs may need to exchange the data among each other for transmission to a STA. With JT, the combination of antennas of the multiple APs transmitting to one or more STAs may be considered as one large antenna array (which may be represented as a virtual antenna array) used for beamforming and transmitting signals. In combination with MU-MIMO techniques, the multiple antennas of the multiple APs may be able to transmit data via multiple spatial streams. Accordingly, each STA may receive data via one or more of the multiple spatial streams.

APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUS) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUS may be allocated in 2 MHz intervals, and as such, the smallest RU may include 26 tones consisting of 24 data tones and 2 pilot tones. Consequently, in a 20 MHz channel, up to 9 RUs (such as 2 MHZ, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the band-width-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 5:
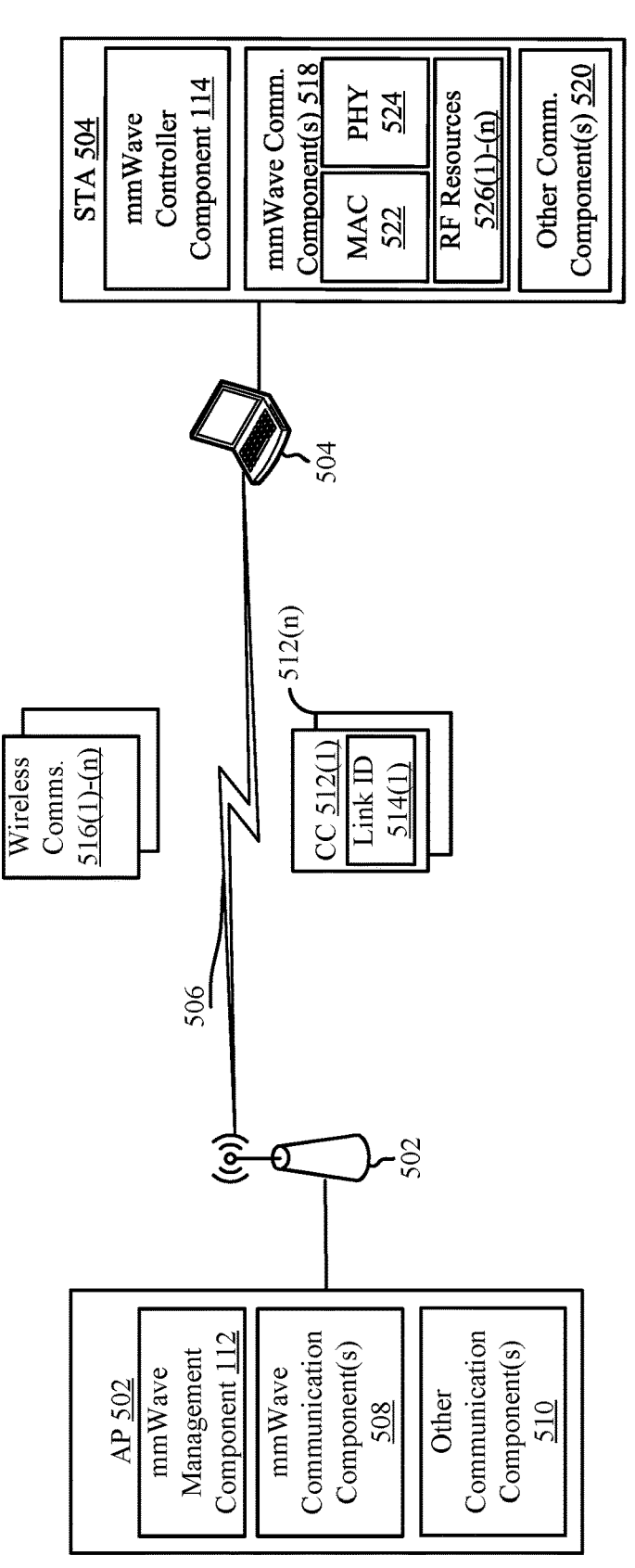
FIG. 5 shows a block diagram of an example wireless communication network.

FIG. 5 shows a block diagram of an example wireless communication network 500. According to some aspects, the wireless communication network 500 can be an example of a wireless local area network (WLAN) such as a Wi-Fi network (and will hereinafter be referred to as WLAN 500). For example, the WLAN 500 can be a network implementing at least one of the IEEE 802.11 family of wireless communication protocol standards.

As illustrated in FIG. 5, the wireless communication network 500 may include an AP 502 (e.g., similar to AP 102) and a STA 504 (e.g., similar to STA 104) that establish and maintain a communication link 506 with each other. Further, the AP 502 and STA 504 may function and communicate (via the respective communication link 506) according to one or more of the IEEE 802.11 family of wireless communication protocol standards. In particular, the AP 502 and STA 504 may transmit and receive wireless communications to and from one another in the form of PPDUs.

As illustrated in FIG. 5, the AP 502 may include a mmWave management component 112, one or more mmWave communication component(s) 508, and one or more other communication components 510. As described herein, the mmWave management component 112 may manage the receive mode of the STA 504. In particular, the mm Wave management component 112 may activate usage of a mmWave band by the STA 504 for wireless communications between the AP 502 and the STA 504. Further in some aspects, the one or more other communication components 510 may include components of an RF chain for performing wireless communications in a sub-7 GHZ band, and the one or more mmWave communication components 508 may include components of an RF chain for performing wireless communication in a mmWave band.

In some aspects, the AP 502 may transmit one or more control communications (CC) 512 (e.g., a RTS, a MU-RTS, or control frame) to the STA 504. For example, the AP 502 may transmit CC 512(1) through CC 512(n). Further, the CC 512 may include a link identifier (ID) 514 of a receive mode of the STA 504. For example, the CC 512 may include a first identifier of a first receive mode at the STA 504 that employs a sub-7 GHz band or a second identifier of a second receive mode at the STA 504 that employs the mmWave band.

In addition, once the CC 512 has been transmitted to the STA 504, the AP 502 may employ the communication components associated with the link identifier 514 for wireless communications with the STA 504. For example, if the mmWave management component 112 transmits a CC 512 identifying the first receive mode of the STA 504, the AP 502 may employ the one or more other communication components 510 to transmit wireless communications 516 (e.g., wireless communications 516(1) through 516(n)) to the STA 504. Conversely, if the mmWave management component 112 transmits a CC 512 identifying the second receive mode of the STA 504, the AP 502 may employ the one or more mmWave communication components 508 to transmit wireless communications 516 to the STA 504 and receive the wireless communications 516 from the STA 504.

As illustrated in FIG. 5, the STA 504 may include a mmWave controller component 114, one or more mmWave communication component(s) 518, and one or more other communication components 520. As described herein, the mmWave controller component 114 may initially operate in a first receive mode where at least some of the one or more mmWave communication components 518 are and may receive the CC 512 via the one or more other communication components 520. As used herein, in some aspects, "deactivating" may refer to at least one of powering down a component of a STA 504, suspending operation of one or more components of a STA 504, transitioning to operation in a reduced power mode, or transitioning to operation in a low power mode. As used herein, in some aspects, "activating" may refer to at least one of powering up a component of a STA 504, resuming operation of one or more components of a STA 504, or transitioning to operation in a normal or higher power mode.

Further, as illustrated in FIG. 5, the one or more mmWave communication components 518 may include a MAC 522, a PHY 524, and a plurality of RF resources 526(1) through 526(n). As used herein, in some aspects, the MAC 522 may be a physical interface transceiver that implements the physical layer for mmWave, e.g., an Ethernet MAC, and the PHY 524 may be a media access controller that implements the data-link layer for mmWave communications, e.g., an Ethernet PHY. As described in more detail with respect to FIG. 6A, in some aspects, the MAC 522 and the PHY 524 may be separate from the MAC and PHY employed by the one or more other communication components 520. Alternatively, as described in more detail with respect to FIGS. 6B-6C, in some aspects, the MAC 522 and/or the PHY 524 may be shared with the one or more other communication components 520. In addition, the plurality of RF resource(s) 526 may implement separate transmit and receive functionalities, or may include a transceiver that combines transmitter and receiver functions. Further, in some aspects, the RF resource(s) 526 may include multiple sets of RF resource components, which may be provided through separate transceivers, or as separate functionalities within the same transceiver. In addition, in some aspects, each set of RF resources 526 may include at least two receive chains and one transmit chain to perform transmit/receive functions. Further, each set of RF resource components may be coupled to a group of at least two antennas.

Upon receipt of the CC 512 via the one or more other communication components 520, the mmWave controller component 114 may determine whether to transition the STA 504 to the second receive mode or remain in the first receive mode with the one or more mmWave communication components 518 being deactivated. For example, if the mm Wave controller component 114 determines that the link identifier 514 corresponds to the first receive mode and/or the one or more other communication components 520, the mmWave controller component 114 may maintain the current state of the STA 504 within the first receive mode and may cause the STA 504 to transmit and receive the wireless communications 516 via the one or more other communication components 520. Conversely, if the mmWave controller component 114 determines that the link identifier 514 corresponds to the second receive mode and/or the one or more mm Wave communication components 518, the STA 504 may activate the one or more mmWave communication components 518 and may cause the STA 504 to transmit and receive the wireless communications 516 via the one or more mmWave communication components 518. Further, in some aspects, the mmWave controller component 114 may deactivate the one or more other communication components 520 in the second receive mode to reduce power consumption during transmission and reception of the wireless communications 516.

Figure 6A:
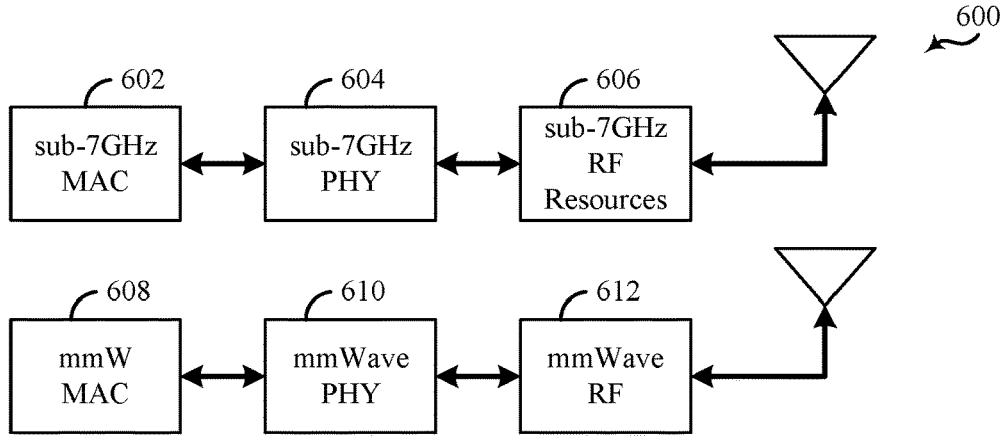
FIG. 6A shows a block diagram of an example of wireless communication components of a wireless STA for multi-receive mode mmWave operation.

FIG. 6A shows a block diagram of an example of wireless communication components for multi-receive mode mmWave operation. According to various embodiments, the STA 600 (and components thereof) may be similar to one or more of the STAs 104 and 504 described with reference to FIGS. 1 and 5. As illustrated in FIG. 6A, in some aspects, the sub-7 GHZ MAC 602 and the sub-7 GHZ PHY 604 employed by the sub-7 GHZ RF resources 606 in the first receive mode may be separate from the Ethernet MAC 608 (e.g., MAC 522) and the Ethernet PHY 610 (e.g., PHY 524) employed by the mm Wave RF resources 612 (e.g., RF resources 526) in the second receive mode.

Figure 6B:
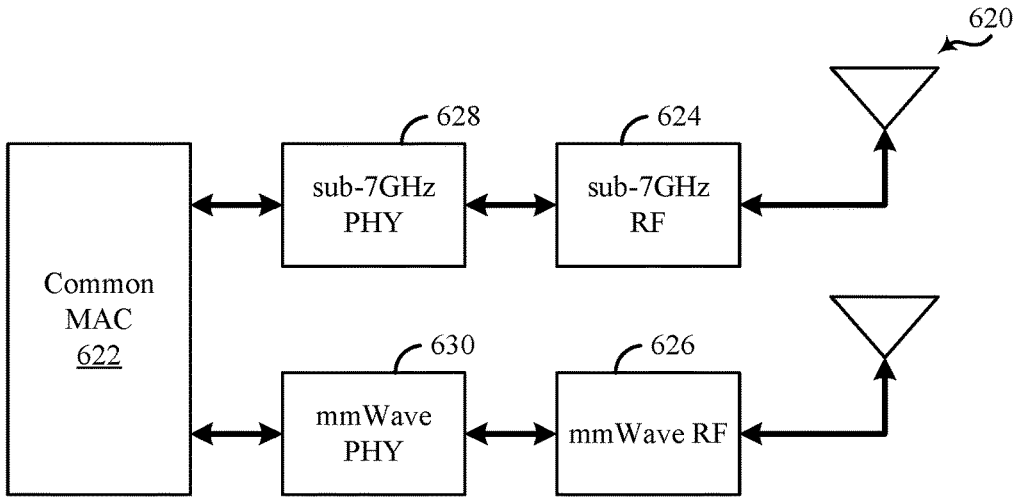
FIG. 6B shows a block diagram of an example of wireless communication components of a wireless STA for multi-receive mode mmWave operation

FIG. 6B shows a block diagram of an example of wireless communication components for multi-receive mode mmWave operation. According to various embodiments, the STA 620 may be similar to one or more of the STAs 104 and 504 described with reference to FIGS. 1 and 5. As illustrated in FIG. 6B, in some aspects, the common MAC 622 may be employed by the sub-7 GHZ RF resources 624 in the first receive mode and the mmWave RF resources 626 (e.g., RF resources 526) in the second receive mode. Further, the sub-7 GHZ PHY 628 employed by the sub-7 GHZ RF resources 624 in the first receive mode may be separate from the mmWave PHY 630 (e.g., PHY 524) employed by the mmWave RF resources 626 (e.g., RF resources 526) in the second receive mode.

Figure 6C:
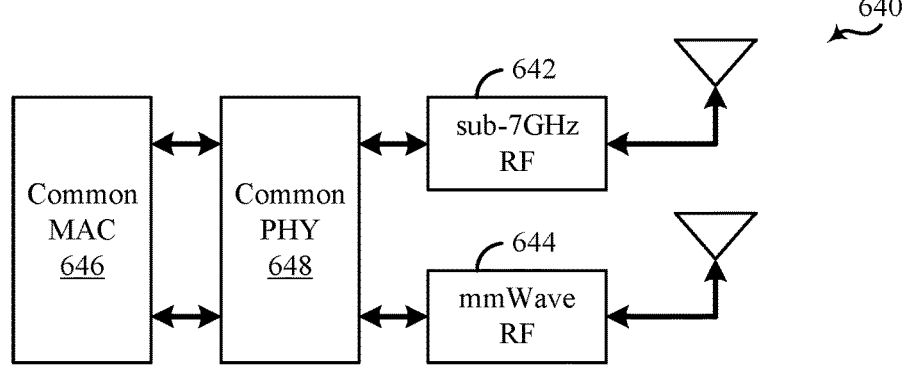
FIG. 6C shows a block diagram of an example of wireless communication components of a wireless STA for multi-receive mode mmWave operation.

FIG. 6C shows a block diagram of an example of wireless communication components for multi-receive mode mmWave operation n. According to various embodiments, the STA 640 may be similar to one or more of the STAs 104 and 504 described with reference to FIGS. 1 and 5. As illustrated in FIG. 6C, the sub-7 GHZ RF resources 642 corresponding to the first receive mode and the mm Wave RF resources 644 (e.g., RF resources 526) corresponding to the second receive mode may use the common MAC 646 and the common PHY 648. Accordingly, aspects of the present disclosure provide for use of an Ethernet MAC and Ethernet PHY shared for mm Wave operation, which may result in cost savings when implementing mmWave operation.

Figures 7A, 7B:
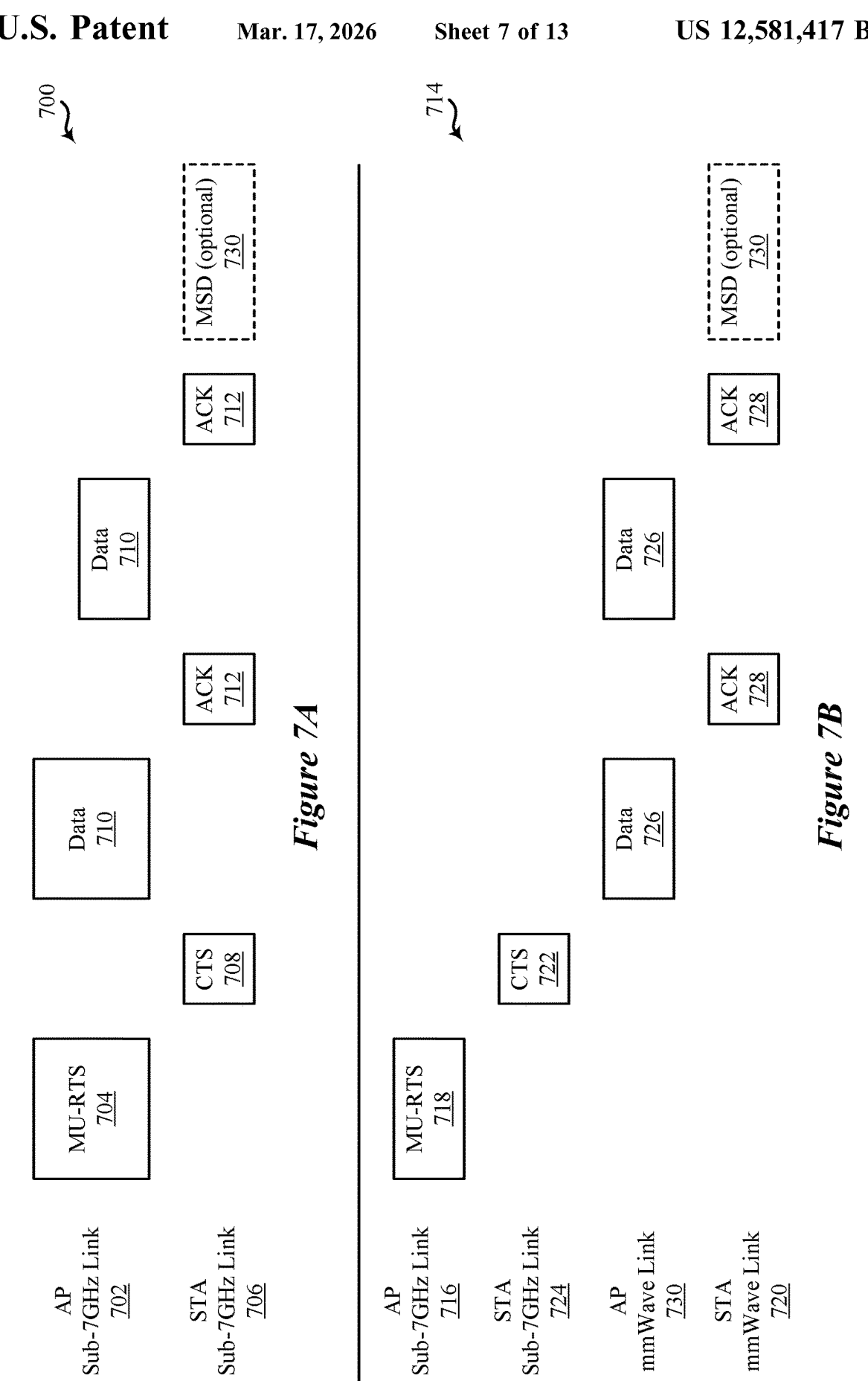
FIG. 7A shows a sequence diagram of an example of wireless communications.
FIG. 7B shows a sequence diagram of an example of wireless communications components for multi-receive mode mmWave operation.

FIG. 7A shows a sequence diagram 700 of an example of wireless communications. As illustrated in FIG. 7A, an AP may employ a sub-7 GHz link 702 to transmit a CC (e.g., CC 512, such as MU-RTS 704) to a STA (e.g., STA 504). In response, the STA may employ a sub-7 GHz link 706 to transmit a clear to send (CTS) 708. In response to the transmission and/or receipt of the CTS 708, the AP and STA may exchange data 710 and acknowledgments (ACK) 712 to the data 710 via the sub-7 GHZ link 702 and sub-7 GHz link 706.

FIG. 7B shows a sequence diagram 714 of an example of wireless communications components for multi-receive mode mmWave operation. As illustrated in FIG. 7B, an AP may employ a sub-7 GHz link 716 to transmit a CC (e.g., CC 512, such as MU-RTS 718) to a STA (e.g., STA 504). As described in more detail herein, the MU-RTS 718 may include a link identifier (e.g., the link identifier 514) identifying the mmWave link 720 of the STA. In response to the MU-RTS 718, the STA may transmit a clear to send (CTS) 722 via the sub-7 GHz link 724 of the STA. In some aspects, the MU-RTS 718 may be a broadcast transmission, and further include a STA identifier of the STA. Further, the STA may transmit the CTS 722 in response to identifying the STA identifier of the STA within the MU-RTS 718. In some other aspects, the MU-RTS 718 may be a unicast transmission to the STA, which triggers transmission of the CTS 722 in response to receipt of the unicast transmission.

Further, in response to the link identifier identifying the mmWave link 720, the STA may activate the mmWave communication components (e.g., the mmWave communication components 518) of the STA. Additionally, in response to the transmission and receipt of the CTS 722, the AP and STA may exchange data 726 and acknowledgments (ACK) 728 to the data 726 via the mmWave link 730 of the AP and the mm Wave link 720 of the STA.

As illustrated in FIGS. 7A-7B, after the transmission of the data 710/ACK 712 and the data 726/ACK 728, a STA may implement a medium synchronization delay (MSD) 730. Further, a STA that has transitioned to the second receive mode for mm Wave communication may return back to the first receive mode after implementing the MSD until further instructions are received from the AP to transition to the second receive mode. As used herein, in some aspects, an MSD may refer a duration of time it takes for a STA to switch between a first link and a second link (e.g., switching from a mmWave link back to a sub-7 GHz link where a control frame may be received). In some aspects, the MSD value might be zero as a STA has two separate radios and therefore does not switch between links as both radios are on. Alternatively, in some other aspects, the MSD value might be non-zero when the links rely on shared components, which may require time for performing the above-referenced switching operation.

Figure 8A:
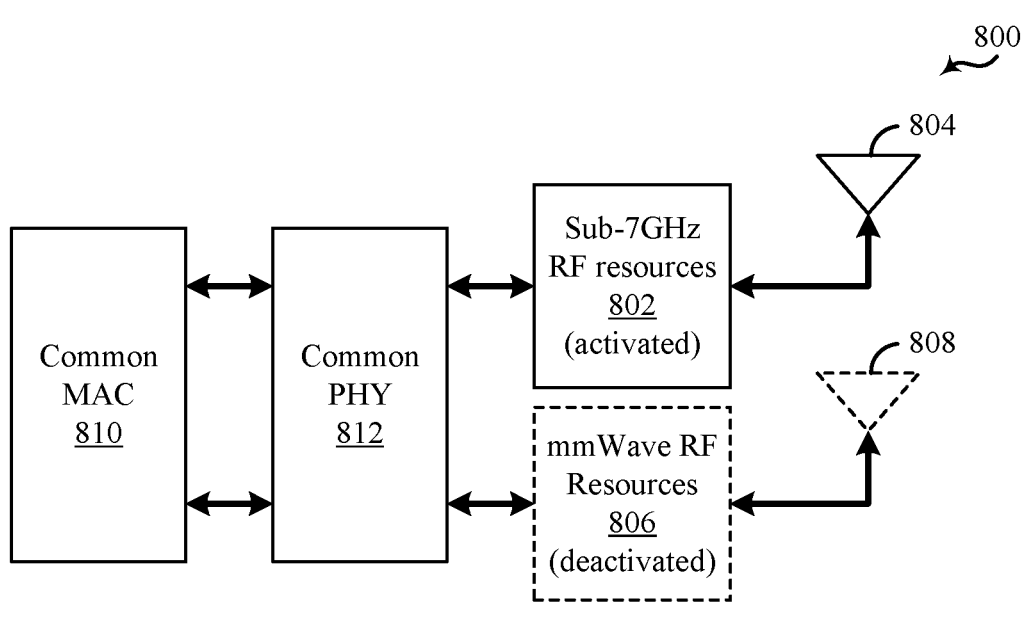
FIG. 8A shows a pictorial diagram of an example of wireless communication components of a wireless STA for multi-receive mode mmWave operation in a first receive mode.

FIG. 8A shows a pictorial diagram of an example of wireless communication components of a STA for multi-receive mode mmWave operation in a first receive mode. As illustrated in FIG. 8A, in a first receive mode, the sub-7 GHz RF resources 802 and the associated antenna 804 of a STA (e.g., STA 104 and/or STA 504) may be activated, while the mmWave RF resources 806 and the associated antenna 808 of the STA are deactivated. As such, the STA may reduce power consumption by minimizing the power provided to the mmWave RF resources 806 and the associated antenna 808 of the STA. As illustrated in FIG. 8A, in some aspects, the sub-7 GHZ RF resources 802 and the mmWave RF resources 806 may be coupled with a common MAC 810 and a common PHY 812.

Figure 8B:
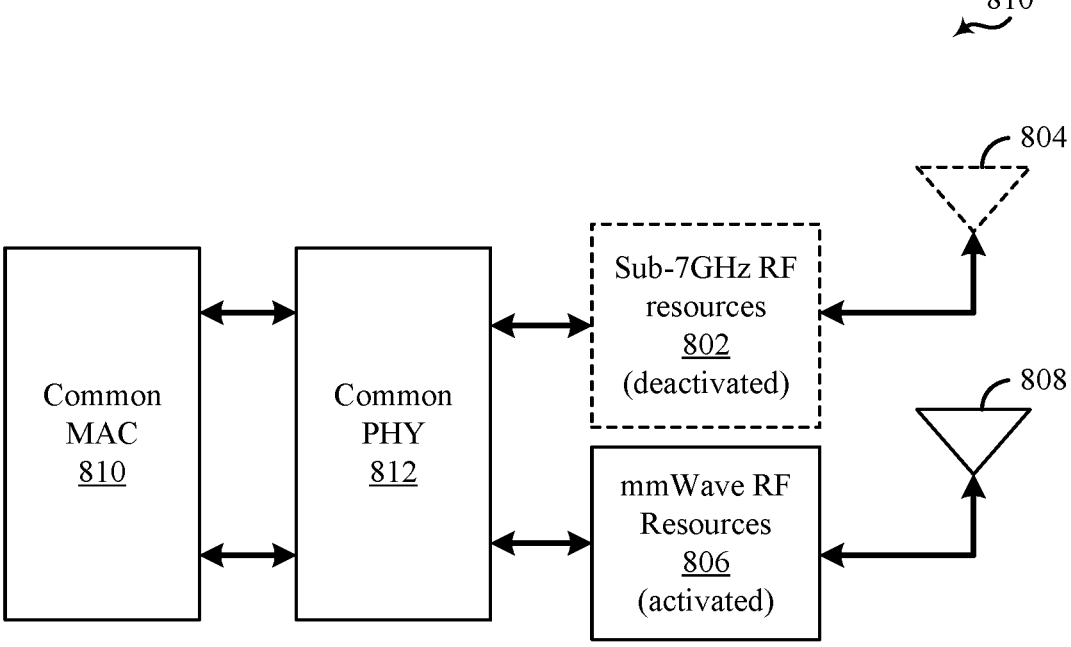
FIG. 8B shows a pictorial diagram of an example of wireless communication components of a wireless STA for multi-receive mode mmWave operation in a second receive mode.

FIG. 8B shows a pictorial diagram of an example of wireless communication components of a STA for multi-receive mode mmWave operation in a second receive mode. As illustrated in FIG. 8B, in a second receive mode, the sub-7 GHZ RF resources 802 and the associated antenna 804 of a STA may be deactivated, while the mmWave RF resources 806 and the associated antenna 808 of the STA are activated. As such, the STA may temporarily activate the mmWave RF resources 806 for improved throughput and latency without incurring significant power consumption costs that would result from activating the mmWave RF resources 806 and the associated antenna 808 when they are not in use.

FIG. 9 shows a flowchart illustrating an example process 900 performable at a wireless STA that supports efficient mmWave operation according to some aspects of the present disclosure. The operations of the process 900 may be implemented by a wireless STA or its components as described herein. For example, the process 900 may be performed by a wireless communication device, such as the wireless communication device 1300 described with reference to FIG. 13, operating as or within a wireless STA. In some examples, the process 900 may be performed by a wireless STA such as one of the STAs 104 described with reference to FIG. 1 or the STA 504 described with reference to FIG. 5.

In some examples, in block 902, the process 900 may include the wireless STA receiving, in a first receive mode, a multi-user request to send (MU-RTS) in a first frequency spectrum. For example, the STA 504 may receive the CC 512 from the AP 502 while in a first receive mode where the one or more mmWave communication components 518 of the STA 504 are deactivated (i.e., the STA 504 may be in a low power mode). Further, the CC 512 may include a link identifier 514 corresponding to a link of the STA 504. Accordingly, the STA 104, the STA 504, the wireless communication device 1300, the processor 1104, the processor 1302, and/or the mmWave controller component 114 may include means for receiving, in a first receive mode, a multi-user request to send (MU-RTS) in a first frequency spectrum.

In some examples, in block 904, the process 900 may include the wireless STA identifying, based on the MU-RTS, a receiver radio frequency (RF) chain associated with data reception in a second frequency spectrum. For example, the STA 504 may determine that the CC 512 includes the link identifier 514 identifying the one or more mmWave communication components 518 and/or a second receive mode of the STA where the one or more mmWave communication components 518 of the STA 504 are activated (e.g., the STA 504 is no longer in a low power mode). Accordingly, the STA 104, the STA 504, the wireless communication device 1300, the processor 1104, the processor 1302, and/or the mmWave controller component 114 may include means for identifying, based on the MU-RTS, a receiver radio frequency (RF) chain associated with data reception in a second frequency spectrum.

In some examples, in block 906, the process 900 may include the wireless STA switching, based on the identifying, from the first receive mode to a second receive mode that uses the receiver RF chain. For example, the receiver RF chain may include one or more components for receiving RF signals and the switching to the second receive mode may include the STA 504 activating the one or more mmWave communication components 518 of the STA 504. Further, in some aspects the STA 504 may also deactivate the one or more other communication components 520. Accordingly, the STA 104, the STA 504, the wireless communication device 1300, the mmWave controller component 114, the processor 1104, the processor 1302, and/or the one or more mm Wave communication components 518 may include means for switching, based on the identifying, from the first receive mode to a second receive mode that uses the receiver RF chain.

In some examples, in block 906, the process 900 may include the wireless STA receiving data via the receiver RF chain. For example, the STA 504 may transmit and receive the wireless communications 516(1)-(n) via the one or more mmWave communication components 518. Accordingly, the STA 104, the STA 504, the wireless communication device 1300, the processor 1104, the processor 1302, and/or the one or more mmWave communication components 518 may include means for switching, by the wireless communication device and based on the identifying, from the first receive mode to a second receive mode that uses the receiver RF chain.

Figure 10:
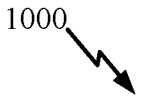
FIG. 10 shows a flowchart illustrating an example process performable by a wireless AP that supports multi-receive mode mmWave operation.

FIG. 10 shows a flowchart illustrating an example process 1000 performable at a wireless AP that supports efficient mmWave operation according to some aspects of the present disclosure. The operations of the process 1000 may be implemented by a wireless AP or its components as described herein. For example, the process 1000 may be performed by a wireless communication device, such as the wireless communication device 1200 described with reference to FIG. 12, operating as or within a wireless AP. In some examples, the process 1000 may be performed by a wireless AP such as one of the APs 102 described with reference to FIG. 1 or the AP 502 described with reference to FIG. 5.

In some examples, in block 1002, the process 1000 may include the wireless AP transmitting to a wireless device in a first transmit mode corresponding to a first frequency spectrum, a multi-user request to send (MU-RTS) including an identifier of a receiver radio frequency (RF) chain associated with data reception in a second frequency spectrum. For example, the AP 502 may transmit the CC 512 to the STA 504 while the STA 504 is in a first receive mode where the one or more mmWave communication components 518 of the STA 504 are deactivated. Further, in some aspects, the CC 512 may include a link identifier 514 corresponding to a link of the STA 504.

Accordingly, the AP 102, the AP 502, the wireless communication device 1200, the mmWave management component 112, and/or the mmWave communication components 508 may include means for transmitting, to a wireless device in a first transmit mode corresponding to a first frequency spectrum, a multi-user request to send (MU-RTS) including an identifier of a receiver radio frequency (RF) chain associated with data reception in a second frequency spectrum.

In some examples, in block 1004, the process 1000 may include the wireless AP transmitting data via the receiver RF chain. For example, the AP 502 may transmit the wireless communications 516 to the STA 504 via the one or more mmWave communication components 508 and receive the wireless communications 516 from the STA 504 via the one or more mmWave communication components 508. Accordingly, the AP 102, the AP 502, the wireless communication device 1200, and/or the mmWave communication components 508 may include means for transmitting, data via the receiver RF chain.

FIG. 11 shows a block diagram of an example wireless communication device 1100. In some implementations, the wireless communication device 1100 can be an example of a device for use in a STA such as one of the STAs 104 or 504 or wireless communication device 1300 described with reference to FIGS. 1, 5, and 13. In some implementations, the wireless communication device 1100 can be an example of a device for use in an AP such as the APs 102 and 502 and wireless communication device 1200 described with reference to FIGS. 1, 5, and 12. The wireless communication device 1100 may be capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be, as well as further IEEE amendments.

The wireless communication device 1100 can be, or can include, a chip, system on chip (SoC), chipset, package or device that includes one or more modems 1104, for example, a Wi-Fi (IEEE 802.11 compliant) modem. In some implementations, the one or more modems 1104 (collectively "the modem 1104") additionally include a WWAN modem (for example, a 3GPP 4G LTE or 5G compliant modem). In some implementations, the wireless communication device 1100 may also include one or more processors, processing blocks or processing elements 1102 (collectively "the processor 1102") coupled with the modem 1104. In some implementations, the wireless communication device 1100 additionally may include one or more radios 1106 (collectively "the radio 1106") coupled with the modem 1104. In some implementations, the wireless communication device 1100 may further include one or more memory blocks or elements 1108 (collectively "the memory 1108") coupled with the processor 1102 or the modem 1104.

The modem 1104 can include an intelligent hardware block or device such as, for example, an application-specific integrated circuit (ASIC) among other possibilities. The modem 1104 may be configured to implement a PHY layer, and in some implementations, also a portion of a MAC layer (for example, a hardware portion of the MAC layer). For example, the modem 1104 may be configured to modulate packets and to output the modulated packets to the radio 1106 for transmission over the wireless medium. The modem 1104 may be similarly configured to obtain modulated packets received by the radio 1106 and to demodulate the packets to provide demodulated packets. In addition to a modulator and a demodulator, the modem 1104 may further include digital signal processing (DSP) circuitry, automatic gain control (AGC) circuitry, a coder, a decoder, a multiplexer and a demultiplexer. For example, while in a transmission mode, data obtained from the processor 1102 may be provided to an encoder, which may encode the data to provide coded bits. The coded bits may then be mapped to a number NSS of spatial streams for spatial multiplexing or a number NSTS of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 1106. In implementations involving beamforming, the modulated symbols in the respective spatial streams may be precoded via a steering matrix prior to their provision to the IFFT block.

While in a reception mode, the DSP circuitry may be configured to acquire a signal including modulated symbols received from the radio 1106, for example, by detecting the presence of the signal and estimating the initial timing and frequency offsets. The DSP circuitry may be further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which may be configured to use information extracted from the digital signals, for example, in one or more received training fields, to determine an appropriate gain. The output of the DSP circuitry may also be coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator may be coupled with the decoder, which may be configured to process the LLRs to provide decoded bits. The decoded bits may then be descrambled and provided to the MAC layer (the processor 1102) for processing, evaluation or interpretation.

The radio 1106 generally may include at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 1100 can include, or be coupled with, multiple transmit antennas (each with a corresponding transmit chain) and multiple receive antennas (each with a corresponding receive chain). The symbols output from the modem 1104 may be provided to the radio 1106, which then transmits the symbols via the coupled antennas. Similarly, symbols received via the antennas may be obtained by the radio 1106, which then provides the symbols to the modem 1104.

The processor 1102 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1102 may process information received through the radio 1106 and the modem 1104, and may processes information to be output through the modem 1104 and the radio 1106 for transmission through the wireless medium. For example, the processor 1102 may implement a control plane and at least a portion of a MAC layer configured to perform various operations related to the generation, transmission, reception and processing of MPDUs, frames or packets. In some implementations, the MAC layer may be configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 1102 may generally control the modem 1104 to cause the modem to perform various operations described above.

The memory 1108 can include tangible storage media such as random-access memory (RAM) or read-only memory (ROM), or combinations thereof. The memory 1108 also can store non-transitory processor- or computer-executable software (SW) code containing instructions that, when executed by the processor 1102, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

FIG. 12 shows a block diagram of an example wireless communication device 1200 that supports efficient mmWave operation according to some aspects of the present disclosure. In some examples, the wireless communication device 1200 is configured or operable to perform the process 1000 described with reference to FIG. 10. In various examples, the wireless communication device 1200 can be a chip, SoC, chipset, package or device that may include: one or more modems 1201 (such as a Wi-Fi (IEEE 802.11) modem or a cellular modem such as 3GPP 4G LTE or 5G compliant modem); one or more processors, processing blocks or processing elements (collectively "the processor 1202"); one or more radios (collectively "the radio 1204"); and one or more memories or memory blocks (collectively "the memory 1206").

In some examples, the wireless communication device 1200 can be a device for use in an AP, such as AP 102 described with reference to FIG. 1. In some other examples, the wireless communication device 1200 can be an AP that includes such a chip, SoC, chipset, package or device as well as multiple antennas 1208. The wireless communication device 1200 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1200 also includes or can be coupled with an application processor 1210 which may be further coupled with another memory. In some examples, the wireless communication device 1200 may further include at least one external network interface 1212 that enables communication with a core network or backhaul network to gain access to external networks including the Internet.

Further, the wireless communication device 1200 may include a mmWave management component 1215 (e.g., the mmWave management component 112), one or more mmWave communication component(s) 1220 (e.g., the mmWave communication component(s) 508), and one or more other communication components 1225 (the one or more other communication components 510). Portions of one or more of the components of the mmWave management component 1215, the one or more mmWave communication component(s) 1220, and the one or more other communication components 1225 may be implemented at least in part in hardware or firmware. For example, the one or more mmWave communication component(s) 122 may be implemented at least in part by a modem (such as the modem 1204). In some implementations, at least some of the components of the mmWave management component 1215, the one or more mmWave communication component(s) 1220, and the one or more other communication components 1225 may be implemented at least in part as software stored in a memory (e.g., the memory 1210). For example, portions of the mmWave management component 1215, the one or more mmWave communication component(s) 1220, and the one or more other communication components 1225 can be implemented as non-transitory instructions (or "code") executable by a processor (e.g., the processor 1205) to perform the functions or operations of the respective component.

In some implementations, the processor may be a component of a processing system. A processing system may generally refer to a system or series of machines or components that receives inputs and processes the inputs to produce a set of outputs (which may be passed to other systems or components of, for example, the device 1200). For example, a processing system of the device 1200 may refer to a system including the various other components or subcomponents of the device 1200, such as the processor, or a transceiver, or a communications manager, or other components or combinations of components of the device 1200. The processing system of the device 1200 may interface with other components of the device 1200, and may process information received from other components (such as inputs or signals) or output information to other components. For example, a chip or modem of the device 1200 may include a processing system, a first interface to output information and a second interface to obtain information. In some implementations, the first interface may refer to an interface between the processing system of the chip or modem and a transmitter, such that the device 1200 may transmit information output from the chip or modem. In some implementations, the second interface may refer to an interface between the processing system of the chip or modem and a receiver, such that the device 1200 may obtain information or signal inputs, and the information may be passed to the processing system. A person having ordinary skill in the art will readily recognize that the first interface also may obtain information or signal inputs, and the second interface also may output information or signal outputs.

FIG. 13 shows a block diagram of an example wireless communication device 1300. In some implementations, the wireless communication device 1300 is configured to perform the process 900 described with reference to FIG. 9. In various examples, the wireless communication device 1300 can be a chip, SoC, chipset, package or device that may include: one or more modems 1301 (such as a Wi-Fi (IEEE 802.11) modem or a cellular modem such as 3GPP 4G LTE or 5G compliant modem); one or more processors, processing blocks or processing elements (collectively "the processor 1302"); one or more radios (collectively "the radio 1304"); and one or more memories or memory blocks (collectively "the memory 1306").

In some examples, the wireless communication device 1300 can be a device for use in a STA, such as STA 104 described with reference to FIG. 1. In some other examples, the wireless communication device 1300 can be a STA that includes such a chip, SoC, chipset, package or device as well as multiple antennas. The wireless communication device 1300 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1300 also includes or can be coupled with an application processor which may be further coupled with another memory. In some examples, the wireless communication device 1300 may further include a user interface (UI) 1308 (such as a touchscreen or keypad) and a display 1310, which may be integrated with the UI to form a touchscreen display. In some examples, the wireless communication device 1300 may further include one or more sensors 1312 such as, for example, one or more inertial sensors, accelerometers, temperature sensors, pressure sensors, or altitude sensors.

Further, the wireless communication device 1300 may include a mmWave controller component 1315 (e.g., the mm Wave controller component 114), one or more mmWave communication component(s) 1320 (e.g., the one or more mmWave communication components 518), and one or more other communication components 1325 (e.g., the one or more other communication components 520). Portions of one or more of the components of the mmWave controller component 1315, the one or more mmWave communication component(s) 1320, and the one or more other communication components 1325 may be implemented at least in part in hardware or firmware. For example, the one or more mmWave communication component(s) 1320 may be implemented at least in part by a modem (such as the modem 1304). In some implementations, at least some of the components of the mmWave controller component 1315, the one or more mmWave communication component(s) 1320, and the one or more other communication components 1325 may be implemented at least in part as software stored in a memory (e.g., the memory 1306). For example, portions of the mmWave controller component 1315, the one or more mmWave communication component(s) 1320, and the one or more other communication components 1325 can be implemented as non-transitory instructions (or "code") executable by a processor (e.g., the processor 1305) to perform the functions or operations of the respective component.

In some implementations, the processor 1302 may be a component of a processing system. A processing system may generally refer to a system or series of machines or components that receives inputs and processes the inputs to produce a set of outputs (which may be passed to other systems or components of, for example, the wireless communication device 1300). For example, a processing system of the wireless communication device 1300 may refer to a system including the various other components or subcomponents of the wireless communication device 1300, such as the processor 1302, or a transceiver, or a communications manager, or other components or combinations of components of the wireless communication device 1300. The processing system of the wireless communication device 1300 may interface with other components of the wireless communication device 1300, and may process information received from other components (such as inputs or signals) or output information to other components. For example, a chip or modem of the wireless communication device 1300 may include a processing system, a first interface to output information and a second interface to obtain information. In some implementations, the first interface may refer to an interface between the processing system of the chip or modem and a transmitter, such that the wireless communication device 1300 may transmit information output from the chip or modem. In some implementations, the second interface may refer to an interface between the processing system of the chip or modem and a receiver, such that the wireless communication device 1300 may obtain information or signal inputs, and the information may be passed to the processing system. A person having ordinary skill in the art will readily recognize that the first interface also may obtain information or signal inputs, and the second interface also may output information or signal outputs.

Implementation examples are described in the following numbered clauses:

Clause 1. A method for wireless communication performable at a wireless communication device, comprising: receiving, by the wireless communication device in a first receive mode, a multi-user request to send (MU-RTS) in a first frequency spectrum; identifying, by the wireless communication device and based on the MU-RTS, a receiver radio frequency (RF) chain associated with data reception in a second frequency spectrum; switching, by the wireless communication device and based on the identifying, from the first receive mode to a second receive mode that uses the receiver RF chain; and receiving, by the wireless communication device, data via the receiver RF chain.

Clause 2. The method for wireless communication of clause 1, wherein receiving the MU-RTS further comprises receiving the MU-RTS in a reduced power mode.

Clause 3. The method for wireless communication of any of clauses 2-3, wherein receiving the MU-RTS further comprises receiving the MU-RTS while one or more components associated with a medium access control (MAC) layer and a physical (PHY) layer are powered down, and wherein the one or more components are coupled with the receiver RF chain.

Clause 4. The method for wireless communication of any of clauses 1-3, wherein identifying the receiver RF chain associated with the data reception in the second frequency spectrum further comprises identifying, within the MU-RTS, a link identifier indicating that an access point (AP) is transmitting the data in the second frequency spectrum.

Clause 5. The method for wireless communication of any of clauses 1-4, wherein switching to the second receive mode using the RF chain further comprises activating one or more components associated with a medium access control (MAC) layer and a physical (PHY) layer coupled with the receiver RF chain.

Clause 6. The method for wireless communication of any of clauses 1-5, wherein the MU-RTS is a first MU-RTS, the receiver RF chain is a first receiver RF chain, the data is first wireless device data, and further comprising: receiving, by the wireless communication device in the first frequency spectrum, a second MU-RTS; identifying, based on the second MU-RTS, a second receiver RF chain for data reception in the first frequency spectrum; and receiving second wireless device data via the first receiver RF chain.

Clause 7. The method for wireless communication of any of clauses 1-6, wherein the first frequency spectrum is a sub-7 gigahertz (GHz) band and the second frequency spectrum is a millimeter wave (mmWave) band.

Clause 8. The method for wireless communication of clause 7, wherein the mmWave band is the 48 GHz band or the 60 GHz band.

Clause 9. A wireless communication device, comprising: at least one memory; at least one processor communicatively coupled with the at least one memory, the at least one processor operable to cause the wireless communication device to: receive, by the wireless device in a first spectrum, a multi-user request to send (MU-RTS) from an access point (AP); identify, by the wireless device, based on the MU-RTS, a receiver radio frequency (RF) chain for data reception in a second spectrum; switch, by the wireless device, to a receive mode that employs the receive RF chain in response to the identifying; and receive, by the wireless device data from the access point via the receive RF chain.

Clause 10. The wireless communication device of clause 9, wherein to receive the MU-RTS from an access point, the at least one processor is operable to cause the wireless communication device to receive the MU-RTS in a lower power mode.

Clause 11. The wireless communication device of any of clauses 9-10, wherein to identify the receiver RF chain for data reception in the second spectrum, the at least one processor is operable to cause the wireless communication device to identify, within the MU-RTS, a link identifier indicating that the AP is transmitting the data in the second spectrum.

Clause 12. The wireless communication device of any of clauses 9-11, wherein to switch to the receive mode using the RF chain, the at least one processor is operable to cause the wireless communication device to activate a medium access control (MAC) layer and a physical (PHY) layer coupled with the receive RF chain.

Clause 13. The wireless communication device of any of clauses 9-12, wherein the MU-RTS is a first MU-RTS, the receive RF chain is a first receive RF chain, the wireless device data is first wireless device data, and the at least one processor is further operable to cause the wireless communication device to: receive, by the wireless device in the first spectrum, a second MU-RTS from the AP; identify, based on the second MU-RTS, a second receive RF chain for data reception in the first spectrum; and receive second wireless device data from the AP via the first rf chain.

Clause 14. The wireless communication device of any of clauses 9-13, wherein the first spectrum is sub-7 GHz band and the second spectrum is a millimeter wave (mmWave) band.

Clause 15. The wireless communication device of clause 9, wherein the mmWave band is the 48 GHz band or the 60 GHz band.

Clause 16. A non-transitory computer-readable device having instructions thereon that, when executed by at least one computing device, cause the at least one computing device to perform operations comprising: receiving, by the wireless device in a first spectrum, a multi-user request to send (MU-RTS) from an access point (AP); identifying, by the wireless device, based on the MU-RTS, a receiver radio frequency (RF) chain for data reception in a second spectrum; switching, by the wireless device, to a receive mode that employs the receive RF chain in response to the identifying; and receiving, by the wireless device data from the access point via the receive RF chain.

Clause 17. The non-transitory computer-readable medium of clause 16, wherein to receiving the MU-RTS from an access point comprises receiving the MU-RTS in a lower power mode.

Clause 18. The non-transitory computer-readable medium of any of clauses 16-17, wherein identifying the receiver RF chain for data reception in the second spectrum comprises identifying, within the MU-RTS, a link identifier indicating that the AP is transmitting the data in the second spectrum.

Clause 19. The non-transitory computer-readable medium of any of clauses 16-18, wherein switching to the receive mode using the RF chain comprises activating a medium access control (MAC) layer and a physical (PHY) layer coupled with the receive RF chain.

Clause 20. The non-transitory computer-readable medium of clauses 16-19, wherein switching to the receive mode using the RF chain comprises activating a medium access control (MAC) layer and a physical (PHY) layer coupled with the receive RF chain.

Clause 21. A wireless communication device, comprising: means for receiving, by the wireless device in a first spectrum, a multi-user request to send (MU-RTS) from an access point (AP); means for identifying, by the wireless device, based on the MU-RTS, a receiver radio frequency (RF) chain for data reception in a second spectrum; means for switching, by the wireless device, to a receive mode that employs the receive RF chain in response to the identifying; and means for receiving, by the wireless device data from the access point via the receive RF chain. As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a'," or the equivalent in context, whatever it is that is "based on 'a'," or "based at least in part on 'a'," may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method for wireless communication performable at a wireless communication device, comprising:

receiving, by the wireless communication device in a first receive mode, a multi-user request to send (MU-RTS) in a first frequency spectrum, wherein receiving the MU-RTS further comprises receiving the MU-RTS while one or more components associated with a medium access control (MAC) layer and a physical (PHY) layer are powered down;

identifying, by the wireless communication device and based on the MU-RTS, a receiver radio frequency (RF) chain associated with data reception in a second frequency spectrum, wherein the one or more components are coupled with the receiver RF chain;

switching, by the wireless communication device and based on the identifying, from the first receive mode to a second receive mode that uses the receiver RF chain, wherein switching to the second receive mode comprises powering up the one or more components coupled with the receiver RF chain; and receiving, by the wireless communication device, data via the receiver RF chain.

2. The method for wireless communication of claim 1, wherein receiving the MU-RTS further comprises receiving the MU-RTS in a reduced power mode.

3. The method for wireless communication of claim 1, wherein identifying the receiver RF chain associated with the data reception in the second frequency spectrum further comprises identifying, within the MU-RTS, a link identifier indicating that an access point (AP) is transmitting the data in the second frequency spectrum.

4. The method for wireless communication of claim 1, wherein switching to the second receive mode using the RF chain further comprises activating one or more components associated with a medium access control (MAC) layer and a physical (PHY) layer coupled with the receiver RF chain.

5. The method for wireless communication of claim 1, wherein the MU-RTS is a first MU-RTS, the receiver RF chain is a first receiver RF chain, the data is first wireless device data, and further comprising:

receiving, in the first frequency spectrum, a second MU-RTS;

identifying, based on the second MU-RTS, a second receiver RF chain for data reception in the first frequency spectrum; and receiving second wireless device data via the first receiver RF chain.

6. The method for wireless communication of claim 1, wherein the first frequency spectrum is a sub-7 gigahertz (GHz) band and the second frequency spectrum is a millimeter wave (mmWave) band.

7. The method for wireless communication of claim 6, wherein the mmWave band is the 48 GHz band or the 60 GHz band.

8. A wireless communication device, comprising:

at least one memory; and at least one processor communicatively coupled with the at least one memory, the at least one processor operable to cause the wireless communication device to:

receive, in a first spectrum, a multi-user request to send (MU-RTS) from an access point (AP), wherein receiving the MU-RTS further comprises receiving the MU-RTS while one or more components associated with a medium access control (MAC) layer and a physical (PHY) layer are powered down;

identify based on the MU-RTS, a receiver radio frequency (RF) chain for data reception in a second spectrum, wherein the one or more components are coupled with the receiver RF chain;

switch to a receive mode that employs the receive RF chain in response to the identifying, wherein switching to the second receive mode comprises powering up the one or more components coupled with the receiver RF chain; and receive, from the access point via the receive RF chain.

9. The wireless communication device of claim 8, wherein to receive the MU-RTS from the access point, the at least one processor is operable to cause the wireless communication device to receive the MU-RTS in a lower power mode.

10. The wireless communication device of claim 8, wherein to identify the receiver RF chain for data reception in the second spectrum, the at least one processor is operable to cause the wireless communication device to identify, within the MU-RTS, a link identifier indicating that the AP is transmitting the data in the second spectrum.

11. The wireless communication device of claim 8, wherein to switch to the receive mode using the RF chain, the at least one processor is operable to cause the wireless communication device to activate a medium access control (MAC) layer and a physical (PHY) layer coupled with the receive RF chain.

12. The wireless communication device of claim 8, wherein the MU-RTS is a first MU-RTS, the receive RF chain is a first receive RF chain, the wireless device data is first wireless device data, and the at least one processor is further operable to cause the wireless communication device to:

receive, in the first spectrum, a second MU-RTS from the AP;

identify, based on the second MU-RTS, a second receive RF chain for data reception in the first spectrum; and receive second wireless device data from the AP via the first receive RF chain.

13. The wireless communication device of claim 8, wherein the first spectrum is sub-7 GHz band and the second spectrum is a millimeter wave (mmWave) band.

14. The wireless communication device of claim 13, wherein the mm Wave band is the 48 GHz band or the 60 GHz band.

15. A non-transitory computer-readable medium having instructions thereon that, when executed by at least one computing device, cause the at least one computing device to perform operations comprising:

receiving, in a first spectrum, a multi-user request to send (MU-RTS) from an access point (AP), wherein receiving the MU-RTS further comprises receiving the MU-RTS while one or more components associated with a medium access control (MAC) layer and a physical (PHY) layer are powered down;

identifying based on the MU-RTS, a receiver radio frequency (RF) chain for data reception in a second spectrum, wherein the one or more components are coupled with the receiver RF chain;

switching to a receive mode that employs the receive RF chain in response to the identifying, wherein switching to the second receive mode comprises powering up the one or more components coupled with the receiver RF chain; and receiving, from the access point via the receive RF chain.

16. The non-transitory computer-readable medium of claim 15, wherein receiving the MU-RTS from the AP comprises receiving the MU-RTS in a lower power mode.

17. The non-transitory computer-readable medium of claim 15, wherein identifying the receiver RF chain for data reception in the second spectrum comprises identifying, within the MU-RTS, a link identifier indicating that the AP is transmitting the data in the second spectrum.

18. The non-transitory computer-readable medium of claim 15, wherein switching to the receive mode using the RF chain comprises activating a medium access control (MAC) layer and a physical (PHY) layer coupled with the receive RF chain.

* * * * *